(12) United States Patent
Legner et al.

(10) Patent No.: US 7,022,044 B2
(45) Date of Patent: Apr. 4, 2006

(54) DRIVE TRAIN FOR POWERING A MOBILE VEHICLE

(75) Inventors: Jürgen Legner, Friedrichshafen (DE); Wolfgang Rebholz, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 14 days.

(21) Appl. No.: 10/800,598

(22) Filed: Mar. 15, 2004

(65) Prior Publication Data

US 2004/0192496 A1 Sep. 30, 2004

(30) Foreign Application Priority Data

Mar. 28, 2003 (DE) ................. 103 14 329

(51) Int. Cl.
*F16H 61/40* (2006.01)

(52) U.S. Cl. ....................................... 477/68

(58) Field of Classification Search ............ 477/68, 477/69; 74/15–4; 60/449, 431, 433
See application file for complete search history.

(56) References Cited

U.S. PATENT DOCUMENTS

| 3,898,806 | A | * | 8/1975 | Press | 60/330 |
| 4,191,270 | A | | 3/1980 | Monteith | |
| 5,509,520 | A | | 4/1996 | Evans et al. | 192/3.23 |
| 5,576,962 | A | * | 11/1996 | Ferguson et al. | 701/101 |
| 6,173,513 | B1 | | 1/2001 | Akimoto | |
| 6,385,970 | B1 | * | 5/2002 | Kuras et al. | 60/448 |
| 6,582,340 | B1 | | 6/2003 | Arie et al. | |
| 6,852,064 | B1 | * | 2/2005 | Carlson et al. | 477/52 |

FOREIGN PATENT DOCUMENTS

| DE | 195 21 458 A1 | 12/1995 |
| DE | 100 57 085 A1 | 5/2001 |
| JP | 4-27784 | 1/1992 |
| JP | 8-142704 | 6/1996 |

* cited by examiner

*Primary Examiner*—Dirk Wright
(74) *Attorney, Agent, or Firm*—Davis & Bujold, P.L.L.C.

(57) ABSTRACT

To reduce the structural volume of a drive engine (1) in a drive train of a mobile vehicle, in particular a working machine such as a wheel loader, a continuously adjustable transmission gear is arranged between the drive engine (1) and a hydraulic pump (5) for the working hydraulic system, which can be adjusted as a function of the load condition of the drive engine (1).

10 Claims, 1 Drawing Sheet

DRIVE TRAIN FOR POWERING A MOBILE VEHICLE

This application claims priority from German Application Serial No. 103 14 329.7 filed Mar. 28, 2003.

FIELD OF THE INVENTION

The invention relates to a drive train for powering a mobile vehicle.

BACKGROUND OF THE INVENTION

Drive trains of this type are preferably used in working machines such as wheel loaders or graders, in which a drive engine, preferably a diesel engine, is connected to the pump impeller of a hydrodynamic converter whose turbine shaft forms the drive input for a shiftable transmission which is connected to drive wheels. An auxiliary drive for powering at least one hydraulic pump, in particular for the working hydraulic system of the working machine, is also connected to the drive engine and is preferably connected to the drive shaft of the hydrodynamic converter. The drive engine and the hydrodynamic converter are designed so that at the fixed braking point, i.e., when the vehicle is stationary under full load and the working hydraulic system is not actuated, the diesel engine runs at a nominal speed. This is necessary so that, at the fixed braking point, the working hydraulic system can be actuated without reducing the speed of the diesel engine below a necessary minimum speed and so stalling it. In most driving conditions, however, the diesel engine is oversized, which has an adverse effect on the manufacturing cost of the vehicle.

DE 195 21 458 A1 discloses an electro-hydraulic control device for the drive of a machine in which, between the diesel engine and the hydrodynamic converter, a clutch is arranged which can always be actuated in the opening direction when the driving speed of the vehicle is low, but sufficient volume flow has to be provided for the working hydraulic system.

The purpose of the present invention is to provide a drive train for powering a mobile vehicle, in particular a working machine, in which a less expensive drive engine can be used, but sufficient volume flow will be available for the working hydraulic system.

This objective is achieved with a drive train of the type described for powering a mobile vehicle.

SUMMARY OF THE INVENTION

According to the invention, a smaller drive engine is used, preferably a diesel engine which, with the hydrodynamic converter, is so designed that at the fixed braking point and, when the working hydraulic system is not actuated, the drive engine is running at close to its maximum torque. Since owing to its design, the drive engine will also run at lower speeds in the part-load range, the auxiliary drive and so too the pump of the working hydraulic system will also be driven at lower speeds in the part-load range. To compensate this, either a hydraulic pump with larger delivery volume or a higher transmission ratio between the hydraulic pump and the drive engine is used. This ensures that in the part-load range the working hydraulic system delivers a sufficient quantity. If the drive engine is in full-load operation and its speed is reduced below a defined value because of high driving resistance then, if a large-volume adjustable hydraulic pump is being used for the working hydraulic system, this is adjusted to lower delivery volume or, if a transmission ratio is used between the hydraulic pump of the working hydraulic system and the drive engine, the transmission ratio is increased so that the speed of the hydraulic pump decreases and the take-up performance of the hydraulic pump is reduced, whereby the load on the drive engine will not be unacceptably high. Preferably, the transmission ratio between the hydraulic pump and the drive engine is continuously adjustable, but it is also possible to design the transmission ratio with various shift steps. When an adjustable hydraulic pump is used, the pump is preferably continuously adjustable, but it is also possible to design the hydraulic pump with at least two controllable intake volumes. It is also possible to use several hydraulic pumps, switching off one or more pumps as a function of the speed of the diesel engine so that the volume flow is again reduced.

This ensures that the hydraulic pump delivers a sufficient quantity for the working hydraulic system in the part-load range without placing too high a load on the drive engine of smaller design.

In a further embodiment, a clutch can be arranged between the drive engine and the hydrodynamic converter. For example, if the wheel loader is moving at very low speed or even is at rest and the working hydraulic system is actuated, this clutch can be actuated in the opening direction to an extent that a desired driving speed is not exceeded, but a sufficient delivery volume is available for the working hydraulic system since the opening of the clutch increases the speed of the drive engine, but less power flows to the propulsion drive. The clutch can also be used to protect the drive engine from excessive load, since the clutch can always be actuated in the opening direction whenever the propulsion drive and the working hydraulic system cause the drive engine's speed to fall below an acceptable value in order to keep the drive engine running. Preferably, the clutch, between the drive engine and the hydrodynamic converter, and the transmission ratio, between the drive engine and the hydraulic pump of the working hydraulic system, or the delivery volume of the hydraulic pump of the working hydraulic system is controlled or regulated as a function of the desired driving speed, the load condition of the drive engine and the demand of the working hydraulic system.

BRIEF DESCRIPTION OF THE DRAWING

The invention will now be described, by way of example, with reference to the accompanying drawings in which.

DETAILED DESCRIPTION OF THE INVENTION

Figure 1:
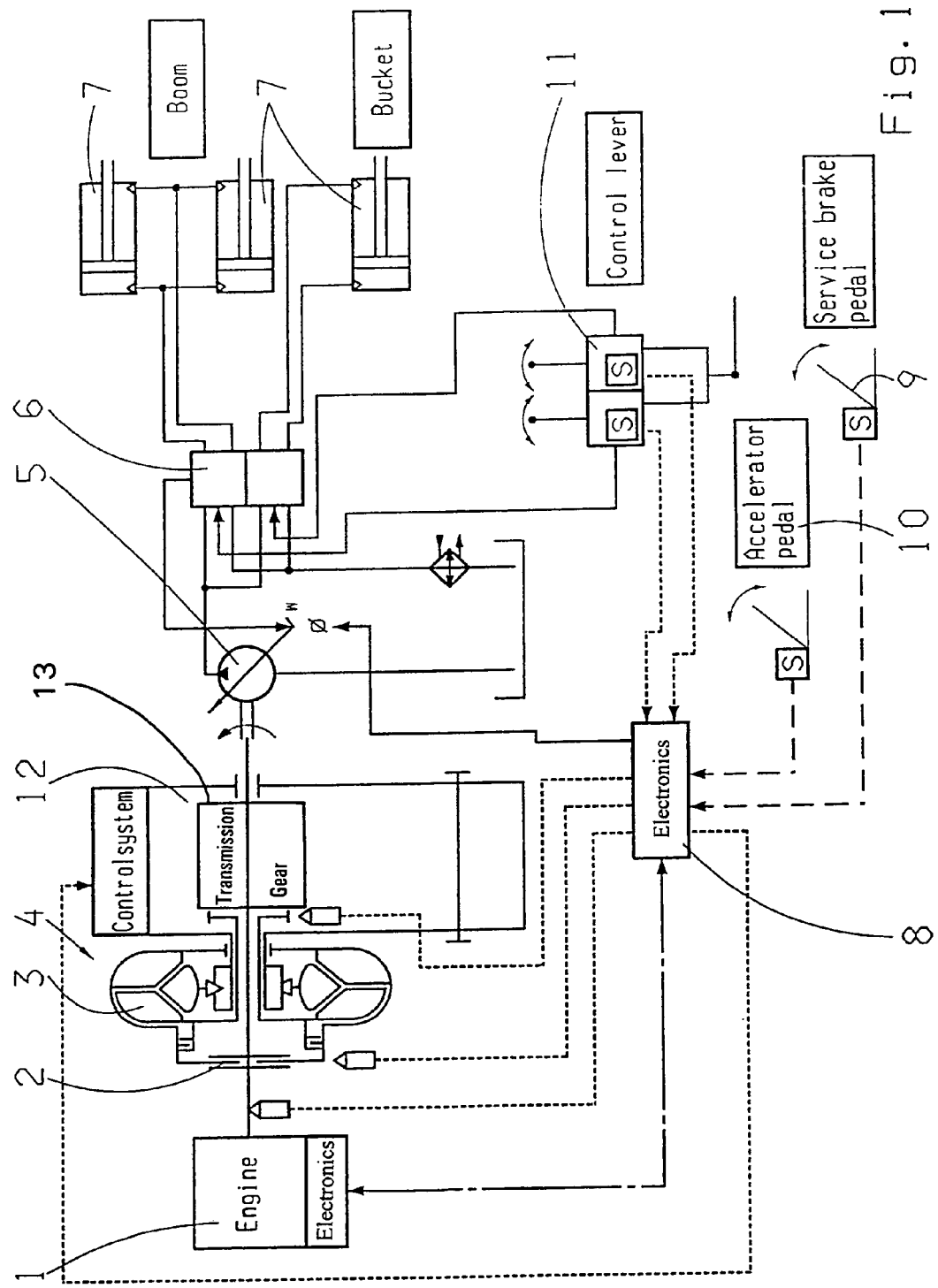
FIG. 1 shows a drive engine with an output shaft driving a pump impeller of a hydrodynamic converter via a primary clutch.

The single FIGURE shows a drive engine 1, whose output shaft drives a pump impeller 3 of a hydrodynamic converter 4 via a primary clutch 2. The drive engine 1 is also connected to a hydraulic pump 5 of the working hydraulic system. The hydraulic pump 5 can be connected to the drive input of the primary clutch 2. The hydraulic pump 5 is preferably a load-sensing pump. The delivery volume of the hydraulic pump 5 is conveyed to consumer 7 such as the scoop of a wheel loader via a valve 6. An electronic control unit 8 processes signals coming from sensors in a brake pedal 9, a driving speed pedal 10, the control lever 11 for the working hydraulic system, the load condition of the drive engine 1, the speed of the pump impeller 3 and the input speed into the speed-change transmission 12. As a function of these parameters, when the larger hydraulic pump 5 with an adjustable delivery volume is used, the electronic control unit regulates the delivery volume or, when an adjustable transmission ratio (not shown) between the hydraulic pump 5 and the drive engine 1 is used, the electronic control system 8 adjusts the transmission ratio. For example, if the drive engine 1 is in the part-load range and, by virtue of the actuation of the control lever 11, the electronic control system 8 recognizes a demand of the hydraulic pump 5 for a volume flow, then the volume flow of the hydraulic pump 5 is increased either by adjusting the hydraulic pump 5 or by adjusting the transmission ratio between the hydraulic pump 5 and the drive engine 1. For example, if the electronic control system 8 recognizes, from the position of the driving speed pedal 10, that the vehicle should be at low speed or even at rest, and from the control lever 11 that a volume flow is demanded by the hydraulic pump 5, the primary clutch 2 is actuated in the opening direction and, depending on the load condition of the drive engine 1, the delivery volume of the hydraulic pump 5 or the transmission gear 13, between the drive engine 1 and the hydraulic pump 5, is adjusted in such a manner that the volume flow of the hydraulic pumps increases without the driving speed also increasing. But, if the electronic control system 8 recognizes from the driving speed pedal 10 that the vehicle is moving at high speed while the drive engine 1 is in the part-load range and, from the control lever 11, that a volume flow is needed for the working hydraulic system, then the hydraulic pump 5 is adjusted to give a larger delivery volume or the transmission ratio between the hydraulic pump 5 and the drive engine 1 is also adjusted such that the hydraulic pump 5 delivers a larger volume. However, the volume flow of the hydraulic pump 5 or the transmission ratio of the transmission gear 13 between the hydraulic pump 5 and the drive engine 1 is only adjusted to the extent that the speed of the drive engine 1 does not fall below a defined value.

Thus a drive train form powering a mobile vehicle can be provided in which the hydraulic pump delivers sufficient volume, but the drive engine 1 can be of smaller structural size.

REFERENCE NUMERALS

1 Drive engine
2 Primary clutch
3 Pump impeller
4 Hydrodynamic converter
5 Hydraulic pump
6 Valve
7 Consumer
8 Electronic control unit or control system
9 Brake pedal
10 Driving speed pedal
11 Control lever
12 Speed-shift transmission
13 Transmission gear

The invention claimed is:

1. A drive train for powering a mobile vehicle with a drive engine (1), which powers, on one hand, a drive input of a propulsion drive via a shiftable step-down transmission (12) and, on another hand, an auxiliary drive output for driving at least a hydraulic pump (5),
wherein before the auxiliary drive output there is arranged a transmission gear (13) which adjusts a transmission ratio as a function of a required delivery volume of the hydraulic pump (5) and as a function of a speed and of a load condition of the drive engine (1).

2. The drive train according to claim 1, wherein the step-down transmission (12) is continuously adjustable.

3. The drive train according to claim 1, wherein in a full-load operation below a defined speed of the drive engine (1), the transmission gear (13) is adjusted to a higher transmission ratio so that a drive input speed of the hydraulic pump (5) decreases.

4. The drive train according to claim 1, wherein in a part-load operation below a defined speed of the drive engine (1), the transmission gear (13) is adjusted to a lower transmission ratio so that the drive input speed of a hydraulic pump (5) increases.

5. The drive train according to claim 1, wherein in a full-load operation below a defined speed of the drive engine (1) and delivery volume requirement of the hydraulic pump (5), a clutch (2), arranged between a hydrodynamic converter (4) and the drive engine (1), is actuated in an opening direction so as to result in a defined minimum speed of the drive engine.

6. A drive train for powering a mobile vehicle with a drive engine (1), which powers, on one hand, a shiftable step-down transmission (12) for driving a propulsion drive via a hydrodynamic converter (4) and, on another hand, an auxiliary drive output for driving at least an adjustable hydraulic pump (5),
wherein the adjustable hydraulic pump (5) is adjusted as a function of a required delivery volume of the hydraulic pump (5) and as a function of speed and of a load condition of the drive engine.

7. The drive train according to claim 6, wherein the hydraulic pump (5) can be adjusted continuously.

8. The drive train according to claim 6, wherein in a full-load operation below a defined speed of the drive engine (1) the hydraulic pump (5) is adjusted to deliver a smaller volume flow.

9. The drive train according to claim 6, wherein in a part-load operation below a defined speed of the drive engine (1) the hydraulic pump (5) is adjusted to deliver a larger volume flow.

10. The drive train according to claim 6, wherein in a full-load operation below a defined speed of the drive engine (1) and delivery volume requirement of the hydraulic pump (5), the clutch (2), arranged between the hydrodynamic converter (4) and the drive engine (1), is actuated in an opening direction so as to result in a defined minimum speed of the drive engine.

* * * * *